United States Patent
Richeson et al.

(10) Patent No.: US 8,972,524 B2
(45) Date of Patent: *Mar. 3, 2015

(54) INTERNET PROTOCOL MESSAGE ROUTING OVER A WIRELESS NETWORK OF METERING DEVICES

(75) Inventors: Keith D. Richeson, Cary, NC (US); Andrew J. Borleske, Garner, NC (US); Robert T. Mason, Jr., Raleigh, NC (US); Phillip Fonville, Apex, NC (US)

(73) Assignee: Elster Solutions, LLC, Raleigh, NC (US)

( * ) Notice: Subject to any disclaimer, the term of this patent is extended or adjusted under 35 U.S.C. 154(b) by 407 days.

This patent is subject to a terminal disclaimer.

(21) Appl. No.: 13/427,248

(22) Filed: Mar. 22, 2012

(65) Prior Publication Data

US 2012/0246268 A1  Sep. 27, 2012

Related U.S. Application Data

(60) Provisional application No. 61/466,368, filed on Mar. 22, 2011.

(51) Int. Cl.
| | |
|---|---|
| G06F 15/16 | (2006.01) |
| H04L 29/08 | (2006.01) |
| G01D 4/00 | (2006.01) |
| H04L 12/24 | (2006.01) |
| H04L 29/06 | (2006.01) |
| H04W 84/18 | (2009.01) |

(52) U.S. Cl.
CPC .............. *H04L 67/125* (2013.01); *G01D 4/004* (2013.01); *H04L 41/02* (2013.01); *H04L 69/08* (2013.01); *H04W 84/18* (2013.01); *Y02B 90/242* (2013.01); *Y02B 90/246* (2013.01); *Y04S 20/322* (2013.01); *Y04S 20/42* (2013.01)
USPC .............. 709/217; 700/22; 700/286; 370/318

(58) Field of Classification Search
CPC ......... H04L 67/12; G01D 4/004; G01D 4/006
USPC ........ 709/204, 244; 370/230.1, 241; 715/771; 340/657, 870.02; 702/188; 710/305
See application file for complete search history.

(56) References Cited

U.S. PATENT DOCUMENTS

| | | | |
|---|---|---|---|
| 7,185,131 B2* | 2/2007 | Leach | 710/305 |
| 7,756,030 B2* | 7/2010 | Clave et al. | 370/230.1 |
| 7,783,764 B2* | 8/2010 | Pace et al. | 709/228 |
| 8,125,998 B2 | 2/2012 | Emmanuel | |
| 2004/0059815 A1* | 3/2004 | Buckingham et al. | 709/224 |
| 2008/0068215 A1* | 3/2008 | Stuber et al. | 340/870.02 |
| 2009/0079584 A1* | 3/2009 | Grady et al. | 340/870.02 |
| 2009/0135018 A1* | 5/2009 | Veillette et al. | 340/657 |
| 2010/0195574 A1 | 8/2010 | Richeson et al. | |
| 2011/0061014 A1* | 3/2011 | Frader-Thompson et al. | 715/771 |
| 2011/0140911 A1* | 6/2011 | Pant et al. | 340/870.02 |
| 2011/0222407 A1* | 9/2011 | Matsuo et al. | 370/241 |
| 2011/0235614 A1 | 9/2011 | Lerzer et al. | |

(Continued)

FOREIGN PATENT DOCUMENTS

NZ  582996 A  12/2010

*Primary Examiner* — Dustin Nguyen
(74) *Attorney, Agent, or Firm* — Baker & Hostetler LLP

(57) ABSTRACT

Methods and apparatus are provided for routing Internet Protocol (IP) messages over a network of an advanced metering infrastructure (AMI) system that employs a different communications protocol.

17 Claims, 10 Drawing Sheets

(56) References Cited

U.S. PATENT DOCUMENTS

| | | |
|---|---|---|
| 2011/0302615 A1 | 12/2011 | Helferich |
| 2011/0310247 A1 | 12/2011 | Rensin et al. |
| 2012/0053902 A1* | 3/2012 | Garrison Stuber et al. ... 702/188 |
| 2012/0131100 A1* | 5/2012 | Van Olst et al. ............... 709/204 |

* cited by examiner outbound packet

| Length | SrcAddr | DestAddr | RptPath | Data (payload) |

Figure 3C inbound packet

| Length | SrcAddr | DestAddr | RptAddr | Data (payload) |

Figure 3D

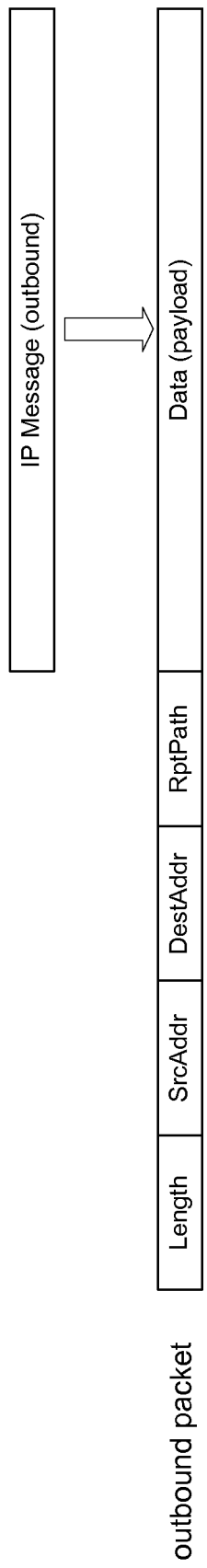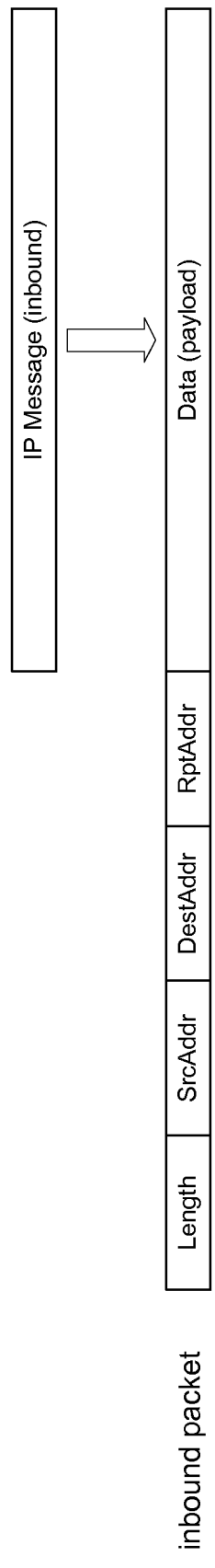
Figure 5A
Figure 5B

INTERNET PROTOCOL MESSAGE ROUTING OVER A WIRELESS NETWORK OF METERING DEVICES

CROSS-REFERENCE TO RELATED APPLICATIONS

This application claims the benefit of the filing date of U.S. Provisional Patent Application Ser. No. 61/466,368, filed Mar. 22, 2011, the contents of which are hereby incorporated by reference in their entirety.

TECHNICAL FIELD

The present invention relates to communications systems, and more particularly, to routing of Internet Protocol (IP) messages destined for network devices through a wireless network of metering devices that does not operate in accordance with the IP protocol.

BACKGROUND

Internet Protocol (IP) is a communication protocol used for relaying messages (packets) across an internetwork, such as the Internet or other IP-based network. It is used to help deliver IP messages from a source host to a destination host based on their IP addresses. To this end, IP defines addressing methods and structures for message encapsulation.

Many utilities have begun to deploy advanced metering infrastructure (AMI) systems to more intelligently measure, collect and analyze energy usage. Such systems often employ their own communications protocols to enable a utility's operations center to communicate with metering devices deployed at subscriber locations. As more and more advanced metering infrastructure (AMI) systems are deployed, it is becoming increasingly desirable to develop products that allow utilities to leverage their investments in such systems to "connect" beyond the AMI system's network.

SUMMARY

Methods and apparatus are provided for routing IP messages over a network of an advanced metering infrastructure (AMI) system that employs a different communications protocol. In one embodiment, a method is provided for use in an AMI system in which a server communicates with a wireless network of metering devices in accordance with a first communications protocol, where each metering device defines a node on the wireless network and each node has a unique identifier on the wireless network. The method enables a computer or server of the AMI system to communicate with a network device that is designed to communicate in accordance with the IP protocol, which is different from the first protocol of the wireless network of metering devices. The network device may comprise, for example, an IP-enabled edge device.

In greater detail, according to one embodiment, a communications interface of a network device is connected to a corresponding communications interface on one of the nodes of the wireless network. When the server of the AMI system receives from an application an IP message that is destined for the network device and is formatted in accordance with the IP protocol, the server will determine the unique identifier of the node of the wireless network of the AMI system to which the network device is connected. Using that unique identifier, a request may then be transmitted to the node via the wireless network of the AMI system in accordance with the communications protocol of that wireless network, requesting that the node write the IP message to a first ANSI C12.19-compliant table in a memory of the node.

Thereafter, the node may retrieve the IP message from the first ANSI C12.19-compliant table and transmit the message to the network device via the connection to its communications interface and in accordance with the IP protocol. The interface between the node and the network device may comprise, for example, an Ethernet connection. Any response received back from the network device via the connection may also be stored by the node in a second ANSI C12.19-compliant table in its memory. Alternatively, the response could be stored in the same first ANSI C12.19-compliant table.

A second request may then be transmitted to the node via the wireless network of the AMI system requesting that the response be read from the second ANSI C12.19-compliant table of the node and transmitted via the wireless network of the AMI system to the server, again in accordance with (or encapsulated within) the communications protocol of the network of the AMI system. Upon receipt of the response, the server may extract and then forward the responsive IP message to the application.

According to an embodiment, an apparatus that may be used to facilitate IP message routing over an AMI system to a network device may comprise: a first communications interface that operates in accordance with a communications protocol of a wireless network of the AMI system and enables the apparatus to communicate as a node of the wireless network; a second communications interface adapted to enable the apparatus to be connected to a corresponding interface of the network device; a memory containing one or more ANSI C12.19-compliant data tables; and a processor. In one embodiment, the processor operates to: communicate via the first communications interface and to establish the apparatus as a node of the wireless network; receive, via the first communications interface in accordance with the first communications protocol, information encapsulated in a data format of the first communications protocol, the encapsulated information comprising a message formatted in accordance with the IP protocol and intended to be delivered to the network device; and extract the encapsulated message and write the message to a first ANSI C12.19-compliant data table in the memory of the apparatus. The processor may further operate to: transmit the message to the network device via the second communications interface in accordance with the IP protocol; receive a response from the network device via the second communications interface in accordance with the IP protocol and write the response to a second ANSI C12.19-compliant data table in the memory; and upon request, read the response from the second ANSI C12.19-complaint data table and transmit the response over the wireless network via the first communications interface and in accordance with the first communications protocol.

Other features and aspects of the methods and apparatus described herein will become apparent from the following detailed description and the associated drawings.

BRIEF DESCRIPTION OF THE DRAWINGS

The foregoing summary, as well as the following detailed description, is better understood when read in conjunction with the appended drawings. For the purpose of illustrating the method and apparatus described herein, there is shown in the drawings exemplary embodiments; however, the invention is not limited to the specific methods and instrumentalities disclosed. In the drawings:

FIG. 3C illustrates one embodiment of an outbound data packet format of the AMI system illustrated in FIGS. 1, 2, 3A and 3B, and FIG. 3D illustrates one embodiment of an inbound data packet format;

FIGS. 5A and 5B illustrate the encapsulation of an IP message in the outbound and inbound packet formats, respectively, of the communications protocol of the AMI system of FIGS. 1, 2, 3A and 3B;

DETAILED DESCRIPTION OF ILLUSTRATIVE EMBODIMENTS

Figure 1:
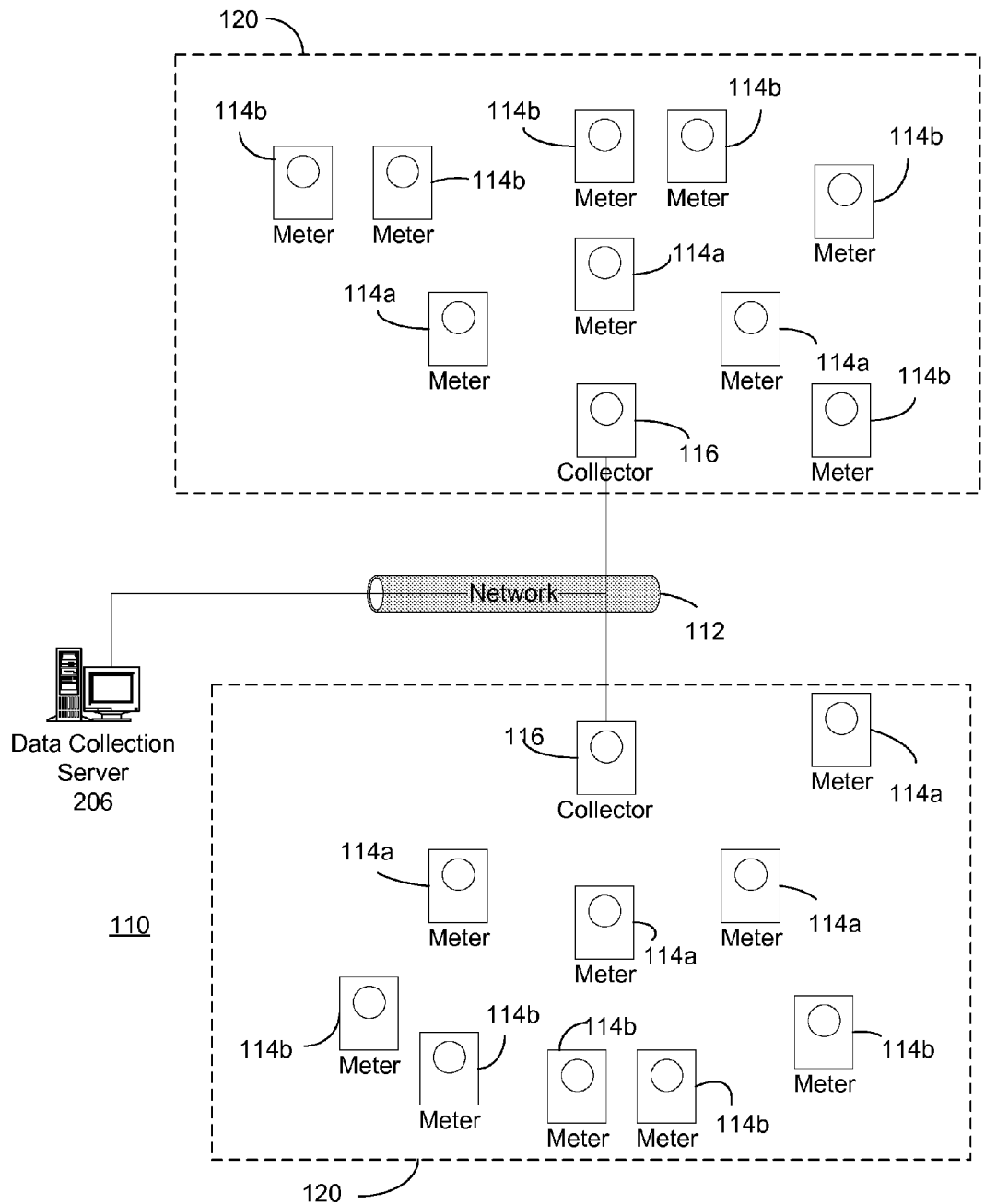
FIG. 1 is a diagram of an exemplary advanced metering infrastructure (AMI) system employing wireless networking.

The methods and apparatus described herein provide the ability to route an Internet Protocol (IP) message destined for a network device that operates in accordance with the Internet Protocol (IP) over an existing network of an AMI system that operates in accordance with a different protocol. Exemplary embodiments of these methods and apparatus are provided below, but it is understood that the invention is not limited to those specific embodiments. While certain details have been provided to illustrate the embodiments described below, it is understood that the invention may be practiced without those specific details. Acronyms and other terms may be used in the following description, however they are not intended to limit the scope of the invention as defined by the appended claims.

Exemplary Advanced Metering Infrastructure (AMI) System

One example of an advanced metering infrastructure (AMI) system 110 in which the methods and apparatus described herein may be employed is illustrated in FIGS. 1, 2 and 3A-D. The description given herein with respect to those figures is for exemplary purposes only and is not intended in any way to limit the scope of potential embodiments.

System 110 comprises a plurality of metering devices, or "meters" 114, which are operable to sense and record consumption or usage of a service or commodity such as, for example, electricity, water, or gas. Meters 114 may be located at customer premises such as, for example, a home or place of business. Meters 114 comprise circuitry for measuring the consumption of the service or commodity being consumed at their respective locations and for generating data reflecting the consumption, as well as other data related thereto. Meters 114 may also comprise circuitry for wirelessly transmitting data generated by the meter to a remote location. Meters 114 may further comprise circuitry for receiving data, commands or instructions wirelessly as well. Meters that are operable to both receive and transmit data may be referred to as "bi-directional" or "two-way" meters (or nodes), while meters that are only capable of transmitting data may be referred to as "transmit-only" or "one-way" meters. In bi-directional meters, the circuitry for transmitting and receiving may comprise a transceiver. In an illustrative embodiment, meters 114 may be, for example, electricity meters manufactured by Elster Solutions, LLC and marketed under the trade name REX.

System 110 further comprises collectors 116. In one embodiment, collectors 116 are also meters operable to detect and record usage of a service or commodity such as, for example, electricity, water, or gas. In addition, collectors 116 are operable to send data to and receive data from meters 114. Thus, like the meters 114, the collectors 116 may comprise both circuitry for measuring the consumption of a service or commodity and for generating data reflecting the consumption and circuitry for transmitting and receiving data. In one embodiment, collector 116 and meters 114 communicate with and amongst one another using any one of several wireless techniques such as, for example, frequency hopping spread spectrum (FHSS) or direct sequence spread spectrum (DSSS). Collectors 116 are also sometimes referred to as "gatekeepers."

A collector 116 and the meters 114 with which it communicates define a subnet or local area network (LAN) 120 of system 110. As used herein, a collector 116 and the meters 114 with which it communicates may be referred to as "nodes" in the subnet/LAN 120. In each subnet/LAN 120, each meter transmits data related to consumption of the commodity being metered at the meter's location. The collector 116 receives the data transmitted by each meter 114, effectively "collecting" it, and then periodically transmits the data from all of the meters in the subnet/LAN 120 to a data collection server 206. The data collection server 206 stores the data for analysis and preparation of bills, for example. The data collection server 206 may be a specially programmed general purpose computing system and may communicate with collectors 116 via a network 112. The network 112 may comprise any form of network, including a wireless network or a fixed-wire network, such as a local area network (LAN), a wide area network (WAN), the Internet, an intranet, a telephone network, such as the public switched telephone network (PSTN), a Frequency Hopping Spread Spectrum (FHSS) radio network, a mesh network, a Wi-Fi (802.11) network, a Wi-Max (802.16) network, a land line (POTS) network, a TCP/IP network, a W-WAN, a GPRS network, a CDMA network, a Fiber network, or any combination of the above.

Figure 2:
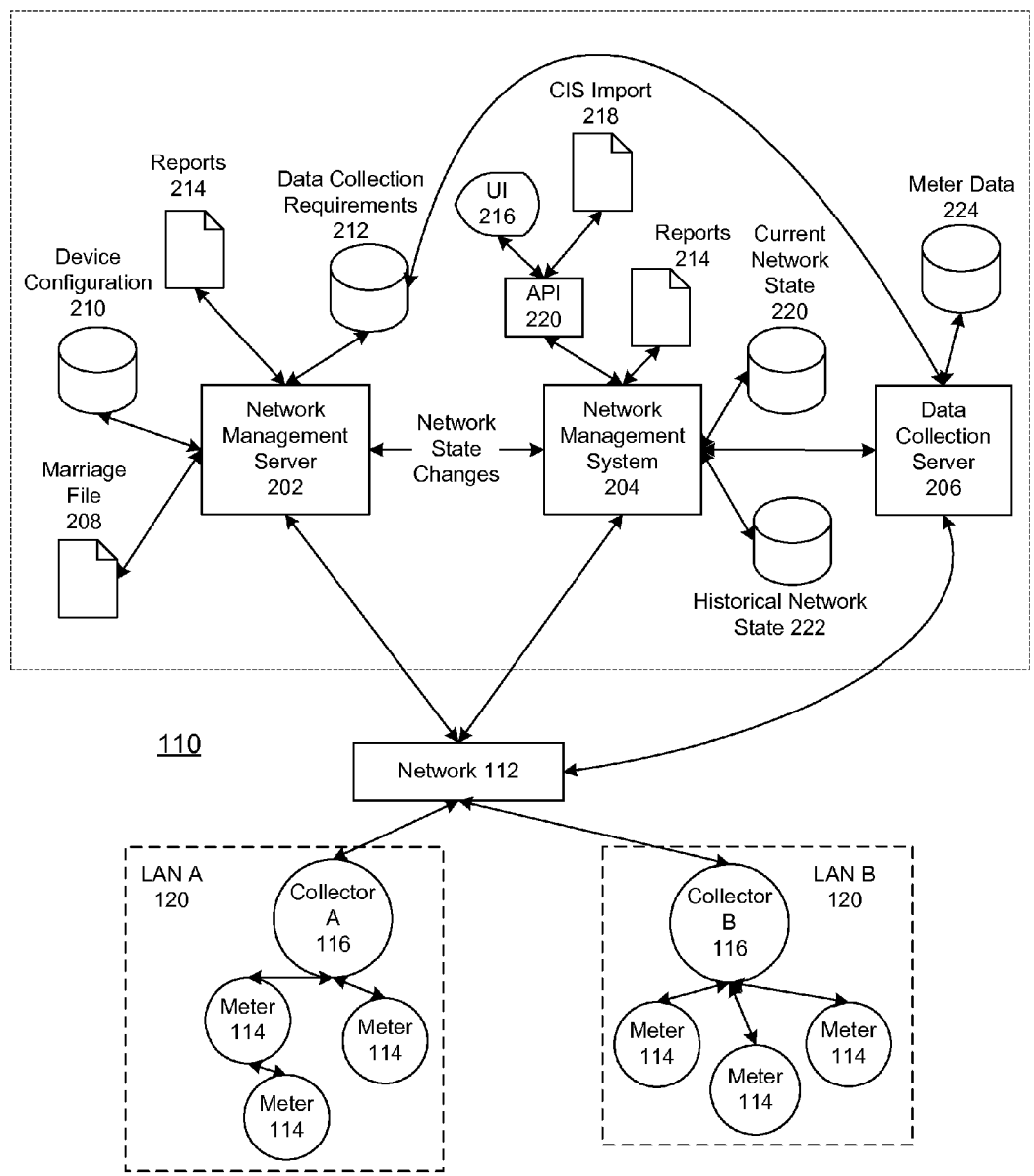
FIG. 2 expands upon the diagram of FIG. 1 and illustrates the exemplary metering system in greater detail.

Referring now to FIG. 2, further details of the metering system 110 are shown. Typically, the system will be operated by a utility company or a company providing information technology services to a utility company. As shown, the system 110 comprises a network management server 202, a network management system (NMS) 204 and the data collection server 206 that together manage one or more subnets/LANs 120 and their constituent nodes. The NMS 204 tracks changes in network state, such as new nodes registering/unregistering with the system 110, node communication paths changing, etc. This information is collected for each subnet/LAN 120 and is detected and forwarded to the network management server 202 and data collection server 206.

Each of the meters 114 and collectors 116 is assigned an identifier (LAN ID) that uniquely identifies that meter or collector on its subnet/LAN 120. In this embodiment, communication between nodes (i.e., the collectors and meters) and the system 110 is accomplished using the LAN ID. However, it is preferable for operators of a utility to query and communicate with the nodes using their own identifiers. To this end, a marriage file 208 may be used to correlate a utility's identifier for a node (e.g., a utility serial number) with both a manufacturer serial number (i.e., a serial number assigned by the manufacturer of the meter) and the LAN ID for each node in the subnet/LAN 120. In this manner, the utility can refer to the meters and collectors by the utilities identifier, while the system can employ the LAN ID for the purpose of designating particular meters during system communications.

A device configuration database 210 stores configuration information regarding the nodes. For example, in the metering system 110, the device configuration database may include data regarding time of use (TOU) switchpoints, etc. for the meters 114 and collectors 116 communicating in the system 110. A data collection requirements database 212 contains information regarding the data to be collected on a per node basis. For example, a utility may specify that metering data such as load profile, demand, TOU, etc. is to be collected from particular meter(s) 114*a*. Reports 214 containing information on the network configuration may be automatically generated or in accordance with a utility request.

The network management system (NMS) 204 maintains a database describing the current state of the global fixed network system (current network state 220) and a database describing the historical state of the system (historical network state 222). The current network state 220 contains data regarding current meter-to-collector assignments, etc. for each subnet/LAN 120. The historical network state 222 is a database from which the state of the network at a particular point in the past can be reconstructed. The NMS 204 is responsible for, amongst other things, providing reports 214 about the state of the network. The NMS 204 may be accessed via an API 220 that is exposed to a user interface 216 and a Customer Information System (CIS) 218. Other external interfaces may also be implemented. In addition, the data collection requirements stored in the database 212 may be set via the user interface 216 or CIS 218.

The data collection server 206 collects data from the nodes (e.g., collectors 116) and stores the data in a database 224. The data includes metering information, such as energy consumption, and may be used for billing purposes, etc. by a utility provider.

The network management server 202, network management system 204 and data collection server 206 communicate with the nodes in each subnet/LAN 120 via network 112.

Figure 3A:
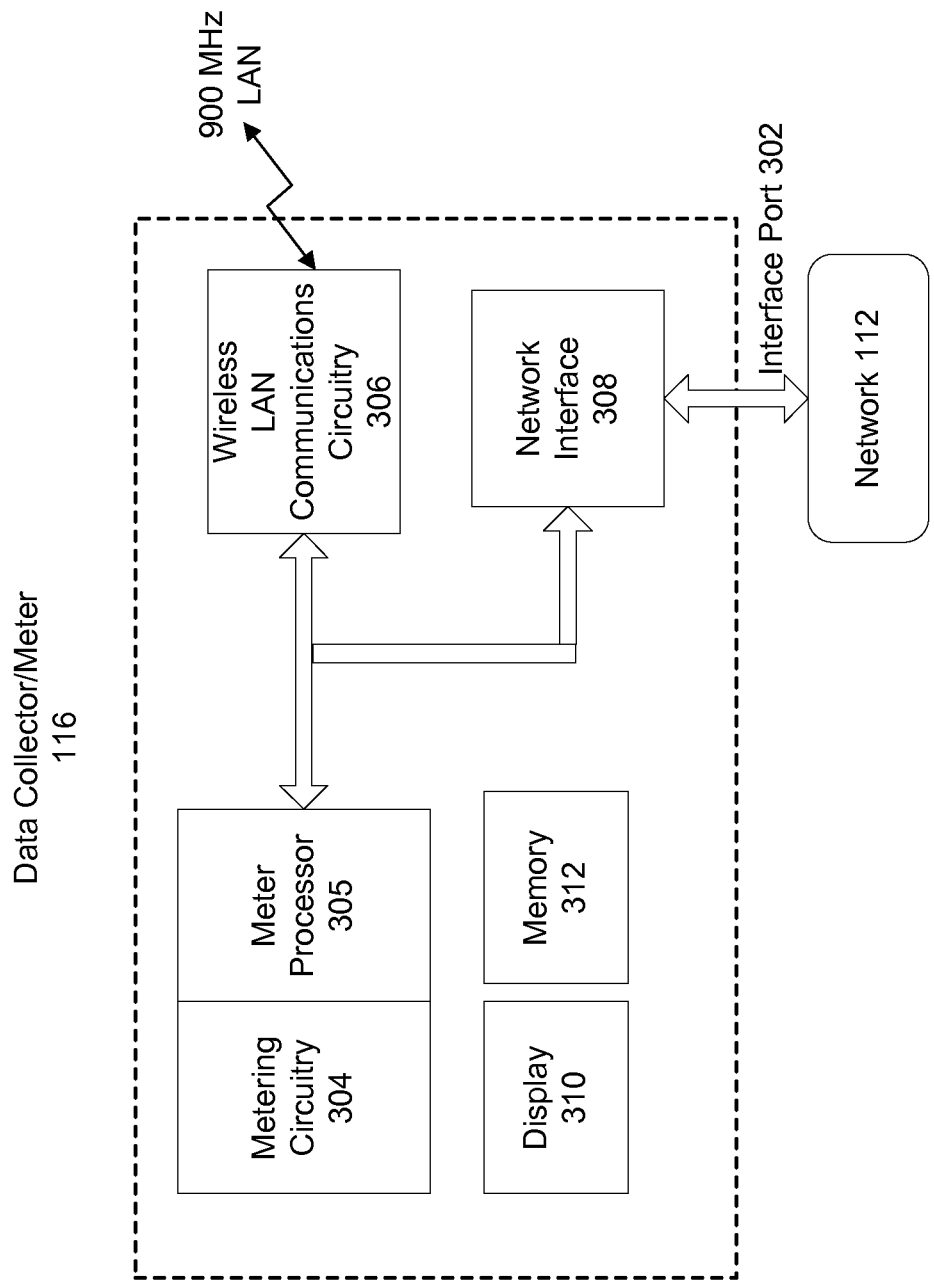
FIG. 3A is a block diagram illustrating an exemplary collector of the metering system of FIG. 1.

FIG. 3A is a block diagram illustrating further details of one embodiment of a collector 116. Although certain components are designated and discussed with reference to FIG. 3A, it should be appreciated that such designations and discussion are not limiting. In fact, various other components typically found in an electronic meter may be a part of collector 116, but have not been shown in FIG. 3A for the purposes of clarity and brevity. Also, other components may be used to accomplish the operation of collector 116. The components that are shown and the functionality described for collector 116 are provided as examples, and are not meant to be exclusive of other components or other functionality.

As shown in FIG. 3A, collector 116 may comprise metering circuitry 304 that performs measurement of consumption of a service or commodity and a processor 305 that controls the overall operation of the metering functions of the collector 116. The collector 116 may further comprise a display 310 for displaying information such as measured quantities and meter status and a memory 312 for storing data. The collector 116 further comprises wireless LAN communications circuitry 306 for communicating wirelessly with the meters 114 in a subnet/LAN and a network interface 308 for communication over the network 112.

In one embodiment, the metering circuitry 304, processor 305, display 310 and memory 312 are implemented using an A3 ALPHA meter available from Elster Solutions, LLC. In that embodiment, the wireless LAN communications circuitry 306 may be implemented by a LAN Option Board (e.g., a 900 MHz two-way radio) installed within the A3 ALPHA meter, and the network interface 308 may be implemented by a WAN Option Board (e.g., a telephone modem) also installed within the A3 ALPHA meter. In this embodiment, the WAN Option Board 308 routes messages from network 112 (via interface port 302) to either the meter processor 305 or the LAN Option Board 306. LAN Option Board 306 may use a transceiver (not shown), for example a 900 MHz radio, to communicate data to meters 114. Also, LAN Option Board 306 may have sufficient memory to store data received from meters 114. This data may include, but is not limited to the following: current billing data (e.g., the present values stored and displayed by meters 114), previous billing period data, previous season data, and load profile data.

LAN Option Board 306 may be capable of synchronizing its time to a real time clock (not shown) in A3 ALPHA meter, thereby synchronizing the LAN reference time to the time in the meter. The processing necessary to carry out the communication functionality and the collection and storage of metering data of the collector 116 may be handled by the processor 305 and/or additional processors (not shown) in the LAN Option Board 306 and the WAN Option Board 308.

The responsibility of a collector 116 is wide and varied. Generally, collector 116 is responsible for managing, processing and routing data communicated between the collector and network 112 and between the collector and meters 114. Collector 116 may continually or intermittently read the current data from meters 114 and store the data in a database (not shown) in collector 116. Such current data may include but is not limited to the total kWh usage, the Time-Of-Use (TOU) kWh usage, peak kW demand, and other energy consumption measurements and status information. Collector 116 also may read and store previous billing and previous season data from meters 114 and store the data in the database in collector 116. The database may be implemented as one or more tables of data within the collector 116.

In one embodiment, the LAN Option Board 306 employs a CC1110 chip available from Texas Instruments, Inc. to implement its wireless transceiver functionality. The CC1110 chip has a built-in Received Signal Strength Indication (RSSI) capability that provides a measurement of the power present in a received radio signal.

Figure 3B:
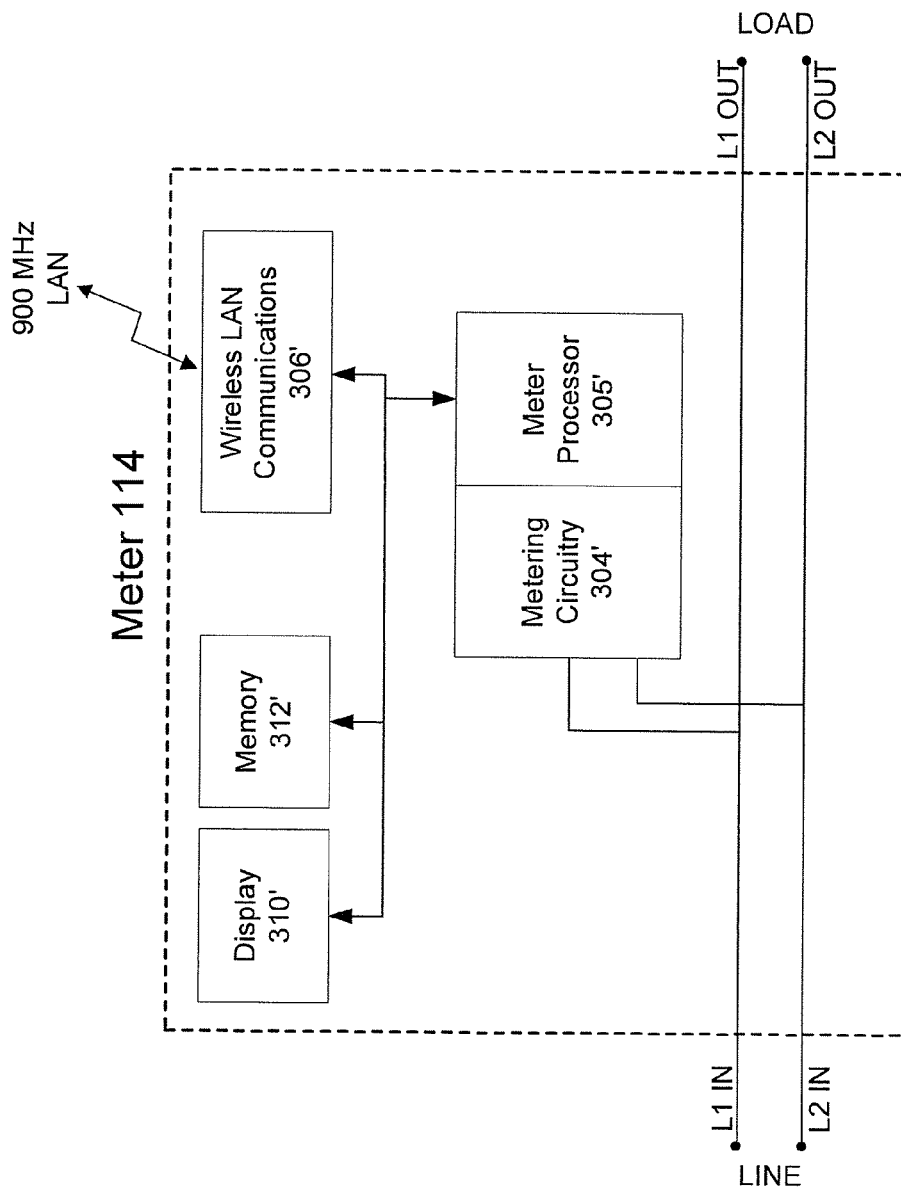
FIG. 3B is a block diagram illustrating an exemplary meter of the metering system of FIG. 1.

FIG. 3B is a block diagram of an exemplary embodiment of a meter 114 that may operate in the system 110 of FIGS. 1 and 2. As shown, the meter 114 comprises metering circuitry 304' for measuring the amount of a service or commodity that is consumed, a processor 305' that controls the overall functions of the meter, a display 310' for displaying meter data and status information, and a memory 312' for storing data and program instructions. The meter 114 further comprises wireless communications circuitry 306' for transmitting and receiving data to/from other meters 114 or a collector 116. The wireless communication circuitry 306' may comprise, for example, the aforementioned CC1110 chip available from Texas Instruments, Inc.

Referring again to FIG. 1, in one embodiment, a collector 116 directly communicates with only a subset of the plurality of meters 114 in its particular subnet/LAN. Meters 114 with which collector 116 directly communicates may be referred to as "level one" meters 114a. The level one meters 114a are said to be one "hop" from the collector 116. Communications between collector 116 and meters 114 other than level one meters 114a are relayed through the level one meters 114a. Thus, the level one meters 114a operate as repeaters for communications between collector 116 and meters 114 located further away in subnet 120.

Each level one meter 114a typically will only be in range to directly communicate with only a subset of the remaining meters 114 in the subnet 120. The meters 114 with which the level one meters 114a directly communicate may be referred to as level two meters 114b. Level two meters 114b are one "hop" from level one meters 114a, and therefore two "hops" from collector 116. Level two meters 114b operate as repeaters for communications between the level one meters 114a and meters 114 located further away from collector 116 in the subnet 120.

While only three levels of meters are shown (collector 116, first level 114a, second level 114b) in FIG. 1, a subnet 120 may comprise any number of levels of meters 114. For example, a subnet 120 may comprise one level of meters but might also comprise eight, sixteen, thirty-two or even more levels of meters 114. In an embodiment, as many as 2048 or more meters may be registered with a single collector 116.

As mentioned above, in one embodiment, each meter 114 and collector 116 that is installed in the system 110 has a unique identifier (LAN ID) stored thereon that uniquely identifies the device from all other devices in the system 110. Additionally, meters 114 operating in a subnet 120 comprise information including the following: data identifying the collector with which the meter is registered; the level in the subnet at which the meter is located; the repeater meter at the prior level with which the meter communicates to send and receive data to/from the collector; an identifier indicating whether the meter is a repeater for other nodes in the subnet; and if the meter operates as a repeater, the identifier that uniquely identifies the repeater within the particular subnet, and the number of meters for which it is a repeater. In one embodiment, collectors 116 have stored thereon this same data for meters 114 that are registered therewith. Thus, collector 116 comprises data identifying the nodes registered therewith as well as data identifying the registered path by which data is communicated from the collector to each such node. Each meter 114 therefore has a designated communications path to the collector that is either a direct path (e.g., all level one nodes) or an indirect path through one or more intermediate nodes that serve as repeaters.

In one embodiment, information is transmitted in the form of packets. For most network tasks such as, for example, reading meter data, collector 116 communicates with meters 114 in the subnet 120 using point-to-point transmissions. For example, a message or instruction from collector 116 may be routed through the designated set of repeaters to the desired meter 114. Similarly, a meter 114 may communicate with collector 116 through the same set of repeaters, but in reverse.

In some instances, however, collector 116 may need to quickly communicate information to all meters 114 located in its subnet 120. Accordingly, collector 116 may issue a broadcast message that is meant to reach all nodes in the subnet 120. The broadcast message may be referred to as a "flood broadcast message." A flood broadcast originates at collector 116 and propagates through the entire subnet 120 one level at a time. For example, collector 116 may transmit a flood broadcast to all first level meters 114a. The first level meters 114a that receive the message pick a random time slot and retransmit the broadcast message to second level meters 114b. Any second level meter 114b can accept the broadcast, thereby providing better coverage from the collector out to the end point meters. Similarly, the second level meters 114b that receive the broadcast message pick a random time slot and communicate the broadcast message to third level meters. This process continues out until the end nodes of the subnet. Thus, a broadcast message gradually propagates outward from the collector to the nodes of the subnet 120.

The flood broadcast packet header contains information to prevent nodes from repeating the flood broadcast packet more than once per level. For example, within a flood broadcast message, a field might exist that indicates to meters/nodes which receive the message, the level of the subnet the message is located; only nodes at that particular level may re-broadcast the message to the next level. If the collector broadcasts a flood message with a level of 1, only level 1 nodes may respond. Prior to re-broadcasting the flood message, the level 1 nodes increment the field to 2 so that only level 2 nodes respond to the broadcast. Information within the flood broadcast packet header ensures that a flood broadcast will eventually die out.

Generally, a collector 116 issues a flood broadcast several times, e.g. five times, successively to increase the probability that all meters in the subnet 120 receive the broadcast. A delay is introduced before each new broadcast to allow the previous broadcast packet time to propagate through all levels of the subnet.

Meters 114 may have a clock formed therein. However, meters 114 often undergo power interruptions that can interfere with the operation of any clock therein. Accordingly, it may not be possible to rely upon the clocks internal to meters 114 to provide accurate time readings. Having the correct time may be necessary, however, when time of use metering is being employed. Indeed, in an embodiment, time of use schedule data may also be comprised in the same broadcast message as the time. Accordingly, collector 116 periodically flood broadcasts the real time to meters 114 in subnet 120. Meters 114 use the time broadcasts to stay synchronized with the rest of the subnet 120. In an illustrative embodiment, collector 116 broadcasts the time every 15 minutes. The broadcasts may be made near the middle of 15 minute clock boundaries that are used in performing load profiling and time of use (TOU) schedules so as to minimize time changes near these boundaries. Maintaining time synchronization is important to the proper operation of the subnet 120. Accordingly, lower priority tasks performed by collector 116 may be delayed while the time broadcasts are performed.

In an illustrative embodiment, the flood broadcasts transmitting time data may be repeated, for example, five times, so as to increase the probability that all nodes receive the time. Furthermore, where time of use schedule data is communicated in the same transmission as the timing data, the subsequent time transmissions allow a different piece of the time of use schedule to be transmitted to the nodes.

Exception messages may be used in subnet 120 to transmit unexpected events that occur at meters 114 to collector 116. In an embodiment, the first 4 seconds of every 32-second period may be allocated as an exception window for meters 114 to transmit exception messages. Meters 114 may transmit their exception messages early enough in the exception window so the message has time to propagate to collector 116 before the end of the exception window. Collector 116 may process the exceptions after the 4-second exception window. Generally, a collector 116 acknowledges exception messages, and the collector 116 waits until the end of the exception window to send this acknowledgement.

In an illustrative embodiment, exception messages may be configured as one of three different types of exception messages: local exceptions, which are handled directly by the collector 116 without intervention from data collection server 206; an immediate exception, which is generally relayed to data collection server 206 under an expedited schedule; and a daily exception, which is communicated to the data collection server 206 on a regular schedule.

Exceptions are processed as follows. When an exception is received at collector 116, the collector 116 identifies the type of exception that has been received. If a local exception has been received, collector 116 takes an action to remedy the problem. For example, when collector 116 receives an exception requesting a "node scan request" such as discussed below, collector 116 transmits a command to initiate a scan procedure to the meter 114 from which the exception was received.

If an immediate exception type has been received, collector 116 makes a record of the exception. An immediate exception might identify, for example, that there has been a power outage. Collector 116 may log the receipt of the exception in one or more tables or files. In an illustrative example, a record of receipt of an immediate exception is made in a table referred to as the "Immediate Exception Log Table." Collector 116 then waits a set period of time before taking further action with respect to the immediate exception. For example, collector 116 may wait 64 seconds. This delay period allows the exception to be corrected before communicating the exception to the data collection server 206. For example, where a power outage was the cause of the immediate exception, collector 116 may wait a set period of time to allow for receipt of a message indicating the power outage has been corrected.

If the exception has not been corrected, collector 116 communicates the immediate exception to data collection server 206. For example, collector 116 may initiate a dial-up connection with data collection server 206 and download the exception data. After reporting an immediate exception to data collection server 206, collector 116 may delay reporting any additional immediate exceptions for a period of time such as ten minutes. This is to avoid reporting exceptions from other meters 114 that relate to, or have the same cause as, the exception that was just reported.

If a daily exception was received, the exception is recorded in a file or a database table. Generally, daily exceptions are occurrences in the subnet 120 that need to be reported to data collection server 206, but are not so urgent that they need to be communicated immediately. For example, when collector 116 registers a new meter 114 in subnet 120, collector 116 records a daily exception identifying that the registration has taken place. In an illustrative embodiment, the exception is recorded in a database table referred to as the "Daily Exception Log Table." Collector 116 communicates the daily exceptions to data collection server 206. Generally, collector 116 communicates the daily exceptions once every 24 hours.

In one embodiment, a collector may assign designated communications paths to meters with bi-directional communication capability, and may change the communication paths for previously registered meters if conditions warrant. For example, when a collector 116 is initially brought into system 110, it needs to identify and register meters in its subnet 120. A "node scan" refers to a process of communication between a collector 116 and meters 114 whereby the collector may identify and register new nodes in a subnet 120 and allow previously registered nodes to switch paths. A collector 116 can implement a node scan on the entire subnet, referred to as a "full node scan," or a node scan can be performed on specially identified nodes, referred to as a "single node scan."

A full node scan may be performed, for example, when a collector is first installed. The collector 116 must identify and register nodes from which it will collect usage data. The collector 116 initiates a node scan by broadcasting a request, which may be referred to as a Node Scan Procedure request. Generally, the Node Scan Procedure request directs that all unregistered meters 114 or nodes that receive the request respond to the collector 116. The request may comprise information such as the unique address of the collector that initiated the procedure. The signal by which collector 116 transmits this request may have limited strength and therefore is detected only at meters 114 that are in proximity of collector 116. Meters 114 that receive the Node Scan Procedure request respond by transmitting their unique identifier as well as other data.

For each meter from which the collector receives a response to the Node Scan Procedure request, the collector tries to qualify the communications path to that meter before registering the meter with the collector. That is, before registering a meter, the collector 116 attempts to determine whether data communications with the meter will be sufficiently reliable. In one embodiment, the collector 116 determines whether the communication path to a responding meter is sufficiently reliable by comparing a Received Signal Strength Indication (RSSI) value (i.e., a measurement of the received radio signal strength) measured with respect to the received response from the meter to a selected threshold value. For example, the threshold value may be −60 dBm. RSSI values above this threshold would be deemed sufficiently reliable. In another embodiment, qualification is performed by transmitting a predetermined number of additional packets to the meter, such as ten packets, and counting the number of acknowledgements received back from the meter. If the number of acknowledgments received is greater than or equal to a selected threshold (e.g., 8 out of 10), then the path is considered to be reliable. In other embodiments, a combination of the two qualification techniques may be employed.

If the qualification threshold is not met, the collector 116 may add an entry for the meter to a "Straggler Table." The entry includes the meter's LAN ID, its qualification score (e.g., 5 out of 10; or its RSSI value), its level (in this case level one) and the unique ID of its parent (in this case the collector's ID).

If the qualification threshold is met or exceeded, the collector 116 registers the node. Registering a meter 114 comprises updating a list of the registered nodes at collector 116. For example, the list may be updated to identify the meter's system-wide unique identifier and the communication path to the node. Collector 116 also records the meter's level in the subnet (i.e. whether the meter is a level one node, level two node, etc.), whether the node operates as a repeater, and if so, the number of meters for which it operates as a repeater. The registration process further comprises transmitting registration information to the meter 114. For example, collector 116 forwards to meter 114 an indication that it is registered, the unique identifier of the collector with which it is registered, the level the meter exists at in the subnet, and the unique identifier of its parent meter that will serve as a repeater for messages the meter may send to the collector. In the case of a level one node, the parent is the collector itself. The meter stores this data and begins to operate as part of the subnet by responding to commands from its collector 116.

Qualification and registration continues for each meter that responds to the collector's initial Node Scan Procedure request. The collector 116 may rebroadcast the Node Scan Procedure additional times so as to insure that all meters 114 that may receive the Node Scan Procedure have an opportunity for their response to be received and the meter qualified as a level one node at collector 116.

The node scan process then continues by performing a similar process as that described above at each of the now registered level one nodes. This process results in the identification and registration of level two nodes. After the level two nodes are identified, a similar node scan process is performed at the level two nodes to identify level three nodes, and so on.

Specifically, to identify and register meters that will become level two meters, for each level one meter, in succession, the collector 116 transmits a command to the level one meter, which may be referred to as an "Initiate Node Scan Procedure" command. This command instructs the level one meter to perform its own node scan process. The request comprises several data items that the receiving meter may use in completing the node scan. For example, the request may comprise the number of timeslots available for responding nodes, the unique address of the collector that initiated the request, and a measure of the reliability of the communications between the target node and the collector. As described below, the measure of reliability may be employed during a process for identifying more reliable paths for previously registered nodes.

The meter that receives the Initiate Node Scan Procedure request responds by performing a node scan process similar to that described above. More specifically, the meter broadcasts a request to which all unregistered nodes may respond. The request comprises the number of timeslots available for responding nodes (which is used to set the period for the node to wait for responses), the unique address of the collector that initiated the node scan procedure, a measure of the reliability of the communications between the sending node and the collector (which may be used in the process of determining whether a meter's path may be switched as described below), the level within the subnet of the node sending the request, and an RSSI threshold (which may also be used in the process of determining whether a registered meter's path may be switched). The meter issuing the node scan request then waits for and receives responses from unregistered nodes. For each response, the meter stores in memory the unique identifier of the responding meter. This information is then transmitted to the collector.

For each unregistered meter that responded to the node scan issued by the level one meter, the collector attempts again to determine the reliability of the communication path to that meter. In one embodiment, the collector sends a "Qualify Nodes Procedure" command to the level one node which instructs the level one node to transmit a predetermined number of additional packets to the potential level two node and to record the number of acknowledgements received back from the potential level two node. This qualification score (e.g., 8 out of 10) is then transmitted back to the collector, which again compares the score to a qualification threshold. In other embodiments, other measures of the communications reliability may be provided, such as an RSSI value.

If the qualification threshold is not met, then the collector adds an entry for the node in the Straggler Table, as discussed above. However, if there already is an entry in the Straggler Table for the node, the collector will update that entry only if the qualification score for this node scan procedure is better than the recorded qualification score from the prior node scan that resulted in an entry for the node.

If the qualification threshold is met or exceeded, the collector 116 registers the node. Again, registering a meter 114 at level two comprises updating a list of the registered nodes at collector 116. For example, the list may be updated to identify the meter's unique identifier and the level of the meter in the subnet. Additionally, the collector's 116 registration information is updated to reflect that the meter 114 from which the scan process was initiated is identified as a repeater (or parent) for the newly registered node. The registration process further comprises transmitting information to the newly registered meter as well as the meter that will serve as a repeater for the newly added node. For example, the node that issued the Initiate Node Scan Procedure request is updated to identify that it operates as a repeater and, if it was previously registered as a repeater, increments a data item identifying the number of nodes for which it serves as a repeater. Thereafter, collector 116 forwards to the newly registered meter an indication that it is registered, an identification of the collector 116 with which it is registered, the level the meter exists at in the subnet, and the unique identifier of the node that will serve as its parent, or repeater, when it communicates with the collector 116.

The collector then performs the same qualification procedure for each other potential level two node that responded to the level one node's node scan request. Once that process is completed for the first level one node, the collector initiates the same procedure at each other level one node until the process of qualifying and registering level two nodes has been completed at each level one node. Once the node scan procedure has been performed by each level one node, resulting in a number of level two nodes being registered with the collector, the collector will then send the Initiate Node Scan Procedure request to each level two node, in turn. Each level two node will then perform the same node scan procedure as performed by the level one nodes, potentially resulting in the registration of a number of level three nodes. The process is then performed at each successive node, until a maximum number of levels is reached (e.g., seven levels) or no unregistered nodes are left in the subnet.

It will be appreciated that in the present embodiment, during the qualification process for a given node at a given level, the collector qualifies the last "hop." For example, if an unregistered node responds to a node scan request from a level four node, and therefore, becomes a potential level five node, the qualification score for that node is based on the reliability of communications between the level four node and the potential level five node (i.e., packets transmitted by the level four node versus acknowledgments received from the potential level five node), not based on any measure of the reliability of the communications over the full path from the collector to the potential level five node. In other embodiments, of course, the qualification score could be based on the full communication path.

At some point, each meter will have an established communication path to the collector which will be either a direct path (i.e., level one nodes) or an indirect path through one or more intermediate nodes that serve as repeaters. If during operation of the network, a meter registered in this manner fails to perform adequately, it may be assigned a different path or possibly to a different collector as described below.

As previously mentioned, a full node scan may be performed when a collector 116 is first introduced to a network. At the conclusion of the full node scan, a collector 116 will have registered a set of meters 114 with which it communicates and reads metering data. Full node scans might be periodically performed by an installed collector to identify new meters 114 that have been brought on-line since the last node scan and to allow registered meters to switch to a different path.

In addition to the full node scan, collector 116 may also perform a process of scanning specific meters 114 in the subnet 120, which is referred to as a "single node scan." For example, collector 116 may issue a specific request to a meter 114 to perform a node scan outside of a full node scan when on a previous attempt to scan the node, the collector 116 was unable to confirm that the particular meter 114 received the node scan request. Also, a collector 116 may request a single node scan of a meter 114 when during the course of a full node scan the collector 116 was unable to read the node scan data from the meter 114. Similarly, a single node scan will be performed when an exception procedure requesting an immediate node scan is received from a meter 114.

The system 110 also automatically reconfigures to accommodate a new meter 114 that may be added. More particularly, the system identifies that the new meter has begun operating and identifies a path to a collector 116 that will become responsible for collecting the metering data. Specifically, the new meter will broadcast an indication that it is unregistered. In one embodiment, this broadcast might be, for example, embedded in, or relayed as part of a request for an update of the real time as described above. The broadcast will be received at one of the registered meters 114 in proximity to the meter that is attempting to register. The registered meter 114 forwards the time to the meter that is attempting to register. The registered node also transmits an exception request to its collector 116 requesting that the collector 116 implement a node scan, which presumably will locate and register the new meter. The collector 116 then transmits a request that the registered node perform a node scan. The registered node will perform the node scan, during which it requests that all unregistered nodes respond. Presumably, the newly added, unregistered meter will respond to the node scan. When it does, the collector will then attempt to qualify and then register the new node in the same manner as described above.

Once a communication path between the collector and a meter is established, the meter can begin transmitting its meter data to the collector and the collector can transmit data and instructions to the meter. Data transmission between a collector and the meters in its subnet are, in one embodiment, performed in accordance with the following communications protocol. In this protocol, data is transmitted in packets. "Outbound" packets are packets transmitted from the collector to a meter at a given level. In one embodiment, as illustrated in FIG. 3C, outbound packets contain the following fields, but other fields may also be included:

Length—the length of the packet;
SrcAddr—source address—in this case, the LAN ID of the collector;
DestAddr—the LAN ID of the meter to which the packet is addressed;
RptPath—the communication path to the destination meter (i.e., the list of identifiers of each repeater in the path from the collector to the destination node); and
Data—the payload of the packet.

The packet may also include integrity check information (e.g., CRC), a pad to fill-out unused portions of the packet and other control information. When the packet is transmitted from the collector, it will only be forwarded on to the destination meter by those repeater meters whose identifiers appear in the RptPath field. Other meters may receive the packet, but meters that are not listed in the path identified in the RptPath field will not repeat the packet.

"Inbound" packets are packets transmitted from a meter at a given level to the collector. In one embodiment, as illustrated in FIG. 3D, inbound packets contain the following fields, but other fields may also be included:

Length—the length of the packet;
SrcAddr—source address—the LAN ID of the meter that initiated the packet;
DestAddr—the LAN ID of the collector to which the packet is to be transmitted;
RptAddr—an identifier of the parent node that serves as the next repeater for the sending node;
Data—the payload of the packet;

Because each meter knows the identifier of its parent node (i.e., the node in the next lower level that serves as a repeater for the present node), an inbound packet need only identify who is the next parent. When a node receives an inbound packet, it checks to see if the RptAddr matches its own identifier. If not, it discards the packet. If so, it knows that it is supposed to forward the packet on toward the collector. The node will then replace the RptAddr field with the identifier of its own parent and will then transmit the packet so that its parent will receive it. This process will continue through each repeater at each successive level until the packet reaches the collector.

For example, suppose a meter at level three initiates transmission of a packet destined for its collector. The level three node will insert in the RptAddr field of the inbound packet the identifier of the level two node that serves as a repeater for the level three node. The level three node will then transmit the packet. Several level two nodes may receive the packet, but only the level two node having an identifier that matches the identifier in the RptAddr field of the packet will acknowledge it. The others will discard it. When the level two node with the matching identifier receives the packet, it will replace the RptAddr field of the packet with the identifier of the level one node that serves as a repeater for that level two node, and the level two node will then transmit the packet. This time, the level one node having the identifier that matches the RptAddr field will receive the packet. The level one node will insert the identifier of the collector in the RptAddr field and will transmit the packet. The collector will then receive the packet to complete the transmission.

A collector 116 periodically retrieves meter data from the meters that are registered with it. For example, meter data may be retrieved from a meter every 4 hours. Where there is a problem with reading the meter data on the regularly scheduled interval, the collector will try to read the data again before the next regularly scheduled interval. Nevertheless, there may be instances wherein the collector 116 is unable to read metering data from a particular meter 114 for a prolonged period of time. The meters 114 store an indication of when they are read by their collector 116 and keep track of the time since their data has last been collected by the collector 116. If the length of time since the last reading exceeds a defined threshold, such as for example, 18 hours, presumably a problem has arisen in the communication path between the particular meter 114 and the collector 116. Accordingly, the meter 114 changes its status to that of an unregistered meter and attempts to locate a new path to a collector 116 via the process described above for a new node. Thus, the exemplary system is operable to reconfigure itself to address inadequacies in the system.

In some instances, while a collector 116 may be able to retrieve data from a registered meter 114 occasionally, the level of success in reading the meter may be inadequate. For example, if a collector 116 attempts to read meter data from a meter 114 every 4 hours but is able to read the data, for example, only 70 percent of the time or less, it may be desirable to find a more reliable path for reading the data from that particular meter. Where the frequency of reading data from a meter 114 falls below a desired success level, the collector 116 transmits a message to the meter 114 to respond to node scans going forward. The meter 114 remains registered but will respond to node scans in the same manner as an unregistered node as described above. In other embodiments, all registered meters may be permitted to respond to node scans, but a meter will only respond to a node scan if the path to the collector through the meter that issued the node scan is shorter (i.e., less hops) than the meter's current path to the collector. A lesser number of hops is assumed to provide a more reliable communication path than a longer path. A node scan request always identifies the level of the node that transmits the request, and using that information, an already registered node that is permitted to respond to node scans can determine if a potential new path to the collector through the node that issued the node scan is shorter than the node's current path to the collector.

If an already registered meter 114 responds to a node scan procedure, the collector 116 recognizes the response as originating from a registered meter but that by re-registering the meter with the node that issued the node scan, the collector may be able to switch the meter to a new, more reliable path. The collector 116 may verify that the RSSI value of the node scan response exceeds an established threshold. If it does not, the potential new path will be rejected. However, if the RSSI threshold is met, the collector 116 will request that the node that issued the node scan perform the qualification process described above (i.e., send a predetermined number of packets to the node and count the number of acknowledgements received). If the resulting qualification score satisfies a threshold, then the collector will register the node with the new path. The registration process comprises updating the collector 116 and meter 114 with data identifying the new repeater (i.e. the node that issued the node scan) with which the updated node will now communicate. Additionally, if the repeater has not previously performed the operation of a repeater, the repeater would need to be updated to identify that it is a repeater. Likewise, the repeater with which the meter previously communicated is updated to identify that it is no longer a repeater for the particular meter 114. In other embodiments, the threshold determination with respect to the RSSI value may be omitted. In such embodiments, only the qualification of the last "hop" (i.e., sending a predetermined number of packets to the node and counting the number of acknowledgements received) will be performed to determine whether to accept or reject the new path.

In some instances, a more reliable communication path for a meter may exist through a collector other than that with which the meter is registered. A meter may automatically recognize the existence of the more reliable communication path, switch collectors, and notify the previous collector that the change has taken place. The process of switching the registration of a meter from a first collector to a second collector begins when a registered meter 114 receives a node scan request from a collector 116 other than the one with which the meter is presently registered. Typically, a registered meter 114 does not respond to node scan requests. However, if the request is likely to result in a more reliable transmission path, even a registered meter may respond. Accordingly, the meter determines if the new collector offers a potentially more reliable transmission path. For example, the meter 114 may determine if the path to the potential new collector 116 comprises fewer hops than the path to the collector with which the meter is registered. If not, the path may not be more reliable and the meter 114 will not respond to the node scan. The meter 114 might also determine if the RSSI of the node scan packet exceeds an RSSI threshold identified in the node scan information. If so, the new collector may offer a more reliable transmission path for meter data. If not, the transmission path may not be acceptable and the meter may not respond. Additionally, if the reliability of communication between the potential new collector and the repeater that would service the meter meets a threshold established when the repeater was registered with its existing collector, the communication path to the new collector may be more reliable. If the reliability does not exceed this threshold, however, the meter 114 does not respond to the node scan.

If it is determined that the path to the new collector may be better than the path to its existing collector, the meter 114 responds to the node scan. Included in the response is information regarding any nodes for which the particular meter may operate as a repeater. For example, the response might identify the number of nodes for which the meter serves as a repeater.

The collector 116 then determines if it has the capacity to service the meter and any meters for which it operates as a repeater. If not, the collector 116 does not respond to the meter that is attempting to change collectors. If, however, the collector 116 determines that it has capacity to service the meter 114, the collector 116 stores registration information about the meter 114. The collector 116 then transmits a registration command to meter 114. The meter 114 updates its registration data to identify that it is now registered with the new collector. The collector 116 then communicates instructions to the meter 114 to initiate a node scan request. Nodes that are unregistered, or that had previously used meter 114 as a repeater respond to the request to identify themselves to collector 116. The collector registers these nodes as is described above in connection with registering new meters/nodes.

Under some circumstances it may be necessary to change a collector. For example, a collector may be malfunctioning and need to be taken off-line. Accordingly, a new communication path must be provided for collecting meter data from the meters serviced by the particular collector. The process of replacing a collector is performed by broadcasting a message to unregister, usually from a replacement collector, to all of the meters that are registered with the collector that is being removed from service. In one embodiment, registered meters may be programmed to only respond to commands from the collector with which they are registered. Accordingly, the command to unregister may comprise the unique identifier of the collector that is being replaced. In response to the command to unregister, the meters begin to operate as unregistered meters and respond to node scan requests. To allow the command to unregister to propagate through the subnet, when a node receives the command it will not unregister immediately, but rather remain registered for a defined period, which may be referred to as the "Time to Live". During this time to live period, the nodes continue to respond to application layer and immediate retries allowing the unregister command to propagate to all nodes in the subnet. Ultimately, the meters register with the replacement collector using the procedure described above.

One of the collector's 116 main responsibilities within subnet 120 is to retrieve metering data from meters 114. In one embodiment, collector 116 has as a goal to obtain at least one successful read of the metering data per day from each node in its subnet. Collector 116 attempts to retrieve the data from all nodes in its subnet 120 at a configurable periodicity. For example, collector 116 may be configured to attempt to retrieve metering data from meters 114 in its subnet 120 once every 4 hours. In greater detail, in one embodiment, the data collection process begins with the collector 116 identifying one of the meters 114 in its subnet 120. For example, collector 116 may review a list of registered nodes and identify one for reading. The collector 116 then communicates a command to the particular meter 114 that it forward its metering data to the collector 116. If the meter reading is successful and the data is received at collector 116, the collector 116 determines if there are other meters that have not been read during the present reading session. If so, processing continues. However, if all of the meters 114 in subnet 120 have been read, the collector waits a defined length of time, such as, for example, 4 hours, before attempting another read.

If during a read of a particular meter, the meter data is not received at collector 116, the collector 116 begins a retry procedure wherein it attempts to retry the data read from the particular meter. Collector 116 continues to attempt to read the data from the node until either the data is read or the next subnet reading takes place. In an embodiment, collector 116 attempts to read the data every 60 minutes. Thus, wherein a subnet reading is taken every 4 hours, collector 116 may issue three retries between subnet readings.

In one embodiment, data collected and stored in the meters 114 of the system 110 of FIGS. 1, 2, 3A and 3B is organized and extracted from each meter 114 in accordance with American National Standards Institute (ANSI) standard C12.19. The ANSI C12.19 standard defines a table structure for utility application data to be passed between an end device, such as a meter 114, and a computer, such as the Network Management Server 204 of FIG. 2. The purpose of the tables is to define structures for transporting data to and from end devices. C12.19 defines both a "standard table" structure and a "manufacturers table" structure. In this embodiment, the Network Management Server 204 includes a set of commands for reading data from, and writing data to, one or more C12.19 tables in an end device, such as a meter 114. Those commands may be transmitted to a meter 114 or other node in accordance with the wireless networking protocol described above.

Routing of IP Messages in an AMI System

Methods and apparatus are described below for routing messages formatted in accordance with the IP protocol over a network of an advanced metering infrastructure (AMI) system that employs a different communications protocol, such as the communications protocol of the AMI system 110 of FIGS. 1, 2, 3A-D described above.

In particular, a method is disclosed for use in an AMI system, like the one described above, in which a server (e.g., the NMS 204, a collector 116 or any combination thereof) communicates with a wireless network of metering devices (like meters 114) in accordance with a first communications protocol, where each metering device defines a node on the wireless network and each node has a unique identifier (e.g., the LAN ID of meters 114) on the wireless network. The method enables the server of the AMI system to communicate with a network device, such as, for example, an IP-enabled edge device, that is designed to communicate in accordance with the Internet Protocol (IP), which is different from the first protocol of the wireless network of metering devices. While in the description below, an IP-enabled edge device is the type of network device to which IP messages may be communicated, it is understood that the invention is by no means limited to use in communicating with IP-enabled edge devices, but rather can be used with any network device that operates in accordance with the IP protocol. As used herein, the term network device means a device, such as any computing device, capable of communicating over a network and includes, without limitation, IP-enabled edge devices, desktop, laptop, notebook and netbook computers, servers, mobile phones, personal digital assistants, tablets, routers, routing switches, bridges, switches, hubs, repeaters, integrated access devices (IADs), multiplexers, access points, user equipment (UE), mobile stations, fixed or mobile subscriber units, wireless sensors, consumer electronics, and the like.

According to one embodiment, a communications interface of the network device is connected to a corresponding communications interface on one of the nodes of the wireless network. When the server receives an IP message from an application that is destined for the network device and is formatted in accordance with the IP protocol, the server will determine the unique identifier of node of the wireless network of the AMI system to which the network device is connected. Using that unique identifier, a request or command may then be transmitted to the node via the wireless network of the AMI system in accordance with the communications protocol of that AMI system network, requesting that the node write the IP message to a first ANSI C12.19-compliant table in a memory of the node.

Thereafter, the node may retrieve the message from the first ANSI C12.19-compliant table and transmit the message to the network device via the connection to its communications interface and in accordance with the IP protocol. Any response received back from the network device via the connection may also be stored by the node in a second ANSI C12.19-compliant table in its memory. Alternatively, the response could be stored in the same first ANSI C12.19-compliant table.

A second request(s) or command(s) may then be transmitted to the node via the wireless network of the AMI system requesting that the response be read from the second ANSI C12.19-compliant table of the node and transmitted via the wireless network of the AMI system to the server. Upon receipt of the response, the server may forward it to the application.

Figure 4:
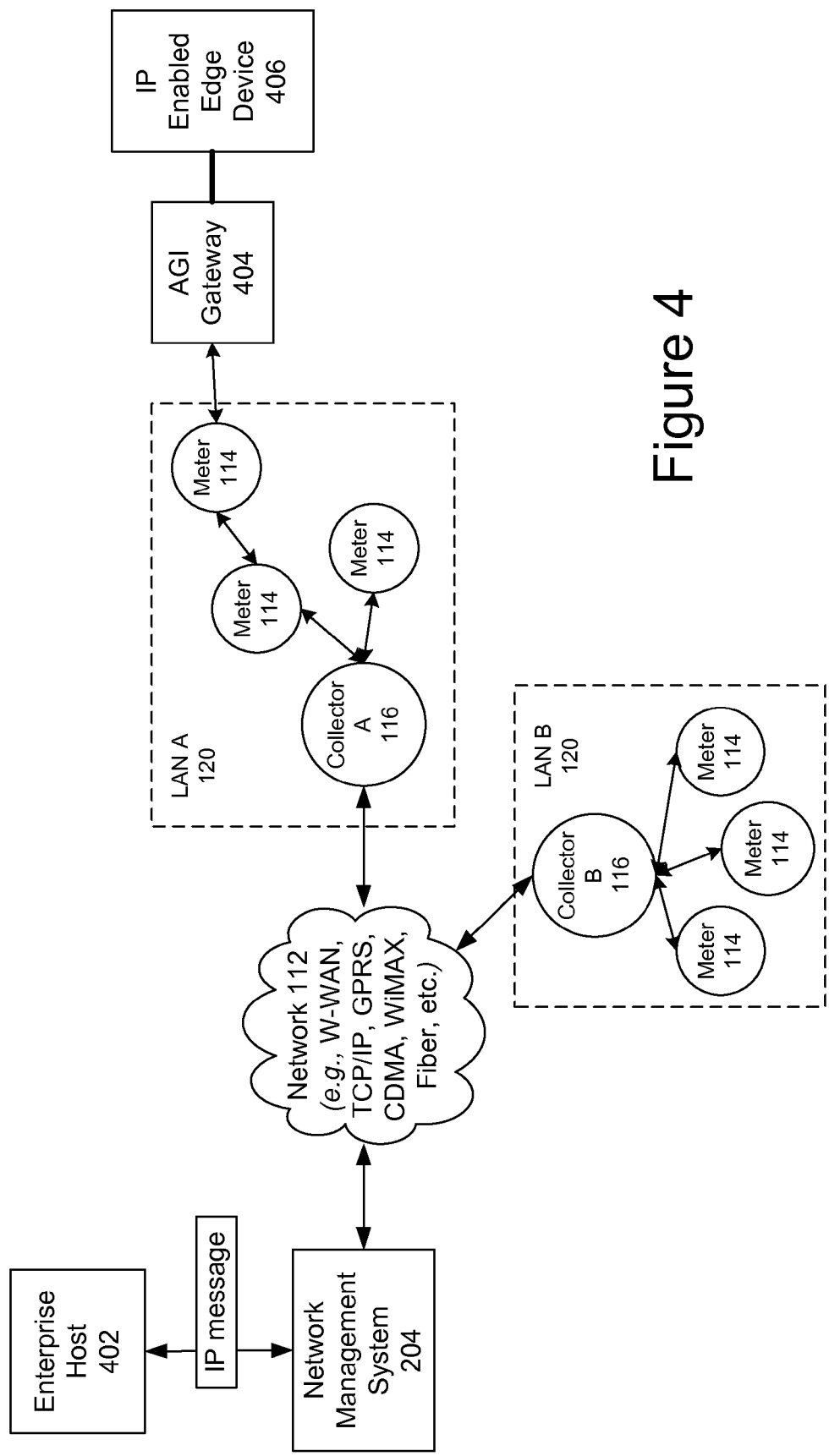
FIG. 4 is a block diagram illustrating one embodiment of the routing of an IP message from a server, over networks of an AMI system, to a network device, such as an IP-enabled edge device.

FIG. 4 illustrates one example of the routing of an IP message through the AMI system 110 described above and illustrated in FIGS. 1, 2, 3A-D. As shown, in this example embodiment, the network device comprises an IP-enabled edge device 406. As mentioned above, however, it is understood that this is just one example of an IP-based network device with respect to which the present methods and systems may be employed. The IP-enabled edge device 406 is connected to a node 404 of the AMI system. The node 404 communicates over the wireless network of the AMI system in accordance with the communications protocol of that system like any other node, such as meters 114. For ease of description only, the node 404 may be referred to herein as a "AGI Gateway." As described more fully below, an IP message destined for the IP-enabled edge device 406 may be routed from the Network Management System software 204 of the AMI system, over network 112 to a collector 116 (collector "A" in this example) with which the AGI Gateway 404 is registered, and then on to the IP-enabled edge device 406 via a connection (e.g., Ethernet) between the IP-enabled edge device 406 and the AGI Gateway 404. One embodiment of this process is illustrated in greater detail in FIGS. 7A, 7B and 7C.

Figures 7A, 7B:
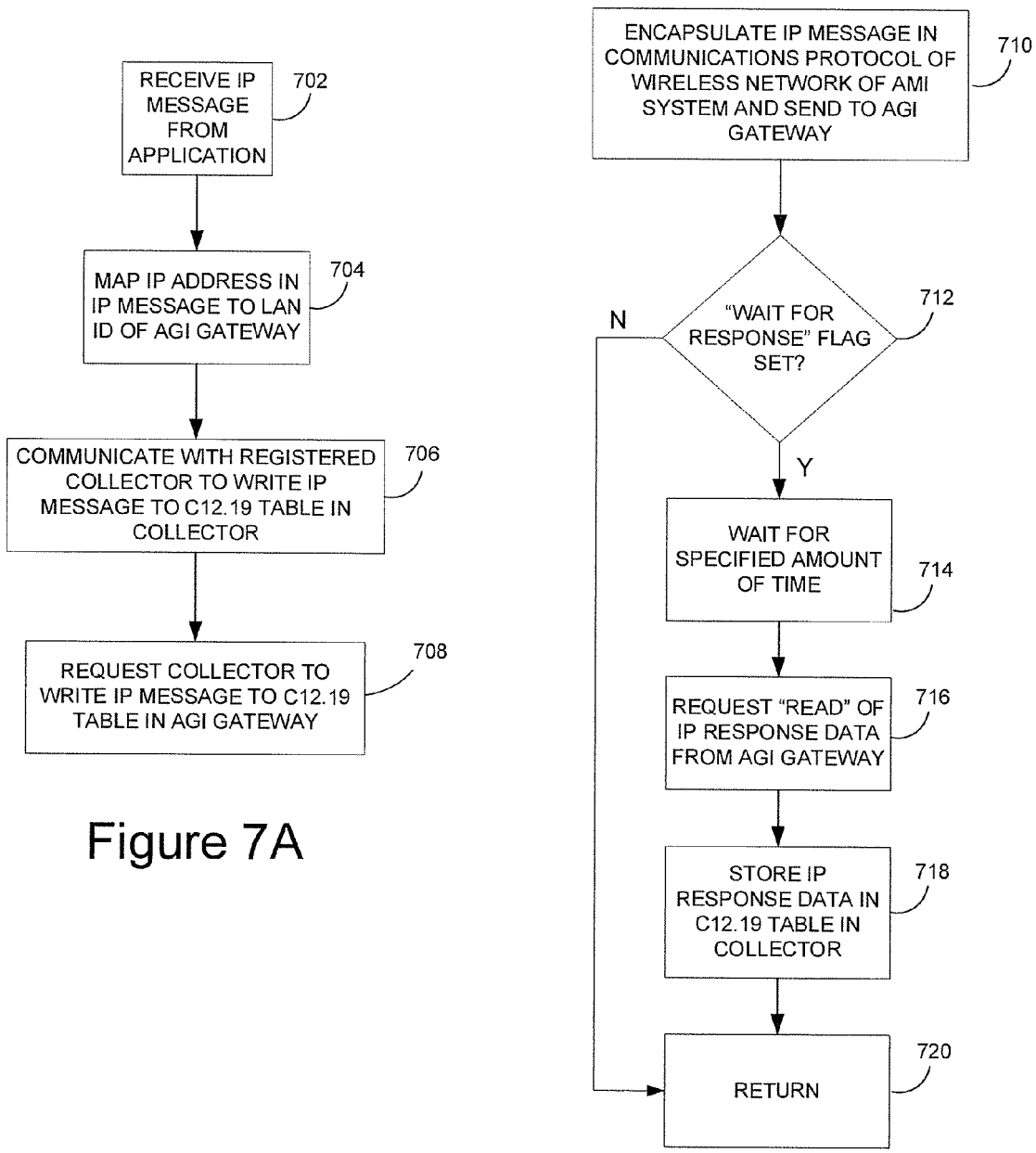
FIGS. 7A-7C are flow diagrams illustrating one embodiment of methods of routing an IP message over the wireless network of an AMI system to a network device.

Referring to FIG. 7A, in one embodiment, the Network Management System (NMS) software 204 of the AMI system 110 may receive an IP message (e.g., packet) from an application executing on a computer (e.g., enterprise host 402), as shown at step 702, which is intended for the IP-enabled edge device 406. Alternatively, the IP message may be received by a different component of the AMI system or another piece of stand-alone software. In step 704, the NMS software 204 (or other software using data from the NMS 204) may map the IP address contained in the IP message to the LAN ID of the AGI Gateway 404 of the wireless network to which the IP-enabled edge device 406 is connected. The NMS software 204 may then also determine the registered collector 116 of the AGI Gateway 404 (e.g., in this example, "collector A" of FIG. 4).

Next, at step 706, the NMS software 204 may communicate with the registered collector 116 of the AGI Gateway 404 and causes the IP message, along with additional control data (message type and length for example), to be written to a first ANSI C12.19 manufacturer's table in the collector 116, referred to hereinafter as the "IP passthrough request" table. In the present embodiment, the communication with the collector 116 may be performed in accordance with ANSI C12 protocols. However, in other embodiments, other protocols may be used. Next in this embodiment, at step 708, the NMS software 204 may invoke a function in the registered collector 116 that effectively requests that the collector 116 write the IP message to an ANSI C12.19 manufacturer's table in the AGI Gateway 404, so that the AGI Gateway 404 may then transmit the IP message to the IP-enabled edge device 406. The request to the collector 116 (i.e., function invocation) may include the following parameters: (i) LAN ID of the AGI Gateway 404 to which the IP-enabled edge device 406 is connected, (ii) an indicator (e.g., flag) that indicates whether or not the collector 116 should wait for a response from the AGI Gateway 404, and (iii) a value specifying the wait time (if the indicator indicates that the collector should wait for a response).

FIG. 7B illustrates the steps performed by the collector 116, after the NMS 204 has caused the IP message to be written to the "IP passthrough request" table of the collector 116 and requested the collector 116 to send the IP message to the AGI Gateway 404 via the wireless network of the AMI system. In step 710, and as also illustrated in FIG. 5A, the IP message may be encapsulated in the communications protocol (specifically the data format thereof) of the wireless network of the AMI system 110. For example, as shown in FIG. 5A, after receiving the LAN ID of the AGI Gateway 404 to which the IP-enabled edge device 406 is connected, the collector 116 may form an outbound data packet formatted in accordance with the communications protocol of the AMI system, and the IP message may be inserted into all or a portion of the Data field of that packet. Other control information (not shown) may also be included in the Data field, such as, for example, the message type and/or length information mentioned above. Also, in cases where the size of the IP message is too large to fit within the Data field of a single outbound data packet of the AMI system, the IP message may be divided into smaller portions that are then inserted into the Data fields of multiple outbound packets. Similarly, any response received by the AGI Gateway 404 from the IP-enabled edge device 406 may be encapsulated in the inbound packet data format of the communications protocol of the AMI system, as illustrated in FIG. 5B.

The collector 116 may then transmit the encapsulated IP message to the AGI Gateway 404 in accordance with the communications protocol of the wireless network of the AMI system, such as the communications protocol described above in the exemplary system shown in FIGS. 1-3D. As used herein and in the claims, the term "server" encompasses any software or component of the NMS 204 or any other component shown in FIG. 2 that is operated by the utility, or any combination thereof, as well as any collector 116 that may transmit an encapsulated IP message, whether alone or on behalf of the NMS 204 or other utility-operated component.

At step 712, the collector 116 checks the "wait for response" indicator (or flag) passed to it with the request from the NMS 204 to determine whether the NMS 204 has instructed the collector 116 to wait for a response to the IP message. If not, then the function invoked in the collector 116 simply returns.

If at step 712, the "wait for response" flag indicates that the collector 116 should wait for a response, then at step 714, the collector 116 waits the amount of time specified in the request from the NMS 204. Once that amount of time expires, control passes to step 716 where the collector 116 requests any such response from the AGI Gateway 404. If there has been a response, the AGI Gateway 404 will transmit the responsive IP message to the collector in accordance with the inbound packet format of the communication protocol of the wireless network of the AMI system. In the present embodiment, upon receipt, at step 718, the collector 116 will store the responsive IP message in a second C12.19 manufacturers table in the memory of the collector 116, referred to herein as the "IP passthrough response" table. At step 720, the collector 116 will return from the invoked function indicating to the NMS 204 that IP response data is available. Once the collector 116 indicates the data is available, the NMS 204 (or other software) may read the IP response data from the collector 116 and return the IP response data to the application program running on host 402. Host 402 may be any computer system, such as a PC, a server or other computing device.

In one embodiment, as described further below, the AGI Gateway 404 may receive IP messages initiated by the IP-enabled edge device 406 (or other network device) and forward them to the collector 116. In this case, the collector 116 will receive the unsolicited IP message data from the AGI Gateway 404 in the same manner as an IP response message, but the IP message will be stored in a third C12.19 manufacturer's table in the collector, referred to herein as an "unsolicited IP passthrough response" table. In this embodiment, the collector 116 may be configured to initiate a "call-in" to notify the NMS 204 (or other software) that new unsolicited IP message data is available. While in the disclosed embodiment, the collector 116 employs three different C12.19 manufacturer's tables, in other embodiments, a same table may be used to store multiple sources of IP message data. For example, one table could be used for both outbound IP messages and responsive messages. In another embodiment, a separate table may be used for outbound IP messages, but just one additional table may be used for both responsive and unsolicited IP messages received from the AGI Gateway 404.

Figure 7C:
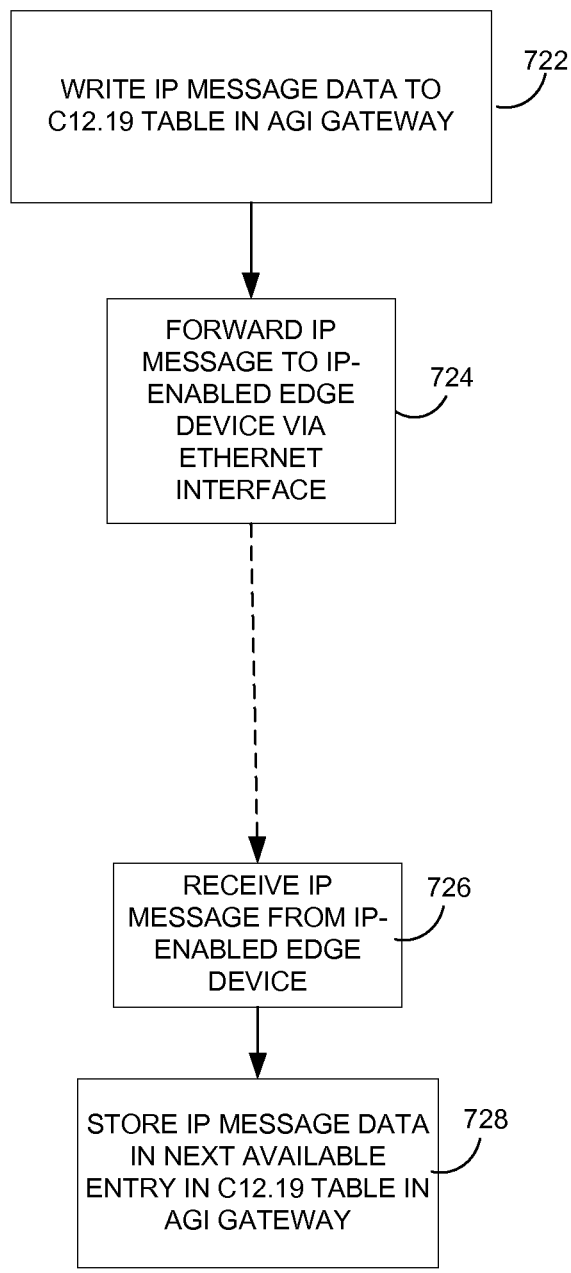

FIG. 7C illustrates the steps performed by the AGI Gateway 404. At step 722, the IP message received in an outbound packet from the collector 116 via the communications protocol of the wireless network of the AMI system is extracted from the outbound packet and written to a C12.19 manufacturer's table in the AGI Gateway 404. In the present embodiment, this table is referred to as the "IP message request" table. Next, at step 724, the AGI Gateway 404 forwards the IP message over the communications interface by which it is connected to the IP-enabled edge device 406. In the present embodiment, the communication interface used to connect the AGI Gateway 404 to the IP-enabled edge device 406 is an Ethernet interface. In other embodiments, different communications interfaces and/or protocols may be employed.

As shown at step 726, the AGI Gateway 404 may receive an IP message over the Ethernet interface, either in response to the IP message the AGI Gateway 404 sent to the IP-enabled edge device 406 or unsolicited from the IP-enabled edge device 406. At step 728, the received IP message is stored in a next available entry in another C12.19 manufacturer's table, referred to herein as the "IP message response" table. In one embodiment, the IP message response table may comprise a circular log of up to 8 IP messages along with header and control information at both the table and entry level (i.e., there is an overall table header as well as a header for each entry). By storing the received IP message data in a circular log, the AGI Gateway 404 may provide a "read IP message" function that the collector 116 (or other reading device) can invoke to request data from the IP message response table (for example, as discussed above). In such an embodiment, the collector 116 (or other reading device) may issue the "read IP message" function to get all unread entries. The AGI Gateway 404 may respond with the amount of unread data available and as much of the unread data as will fit in a single inbound packet (see, e.g., FIG. 5B) of the wireless network of the AMI system. The collector 116 (or other reading device) may then use data from the first response to request the remaining unread data using subsequent collector-AGI Gateway transactions. Thus, in the present embodiment, the AGI Gateway 404 is capable of receiving multiple IP message in response to a single request (or with no request at all, i.e., unsolicited).

In one embodiment, in addition to storing received IP messages in the IP message response table, the AGI Gateway 404 may be configured to generate an exception message in accordance with the communications protocol of the wireless network of the AMI system (like the exception messages discussed above in connection with the description of the exemplary AMI system), to notify the collector 116 that IP message data is available. This may allow for timely reporting of IP messages that are generated by the IP-enabled edge device 406 outside of a request from an application. Further, the AGI Gateway 404 may be configured to ignore any exception window of the wireless network protocol of the AMI system, further expediting the reporting of unsolicited IP messages to the collector 116 and in turn to an application at the host 402.

Figure 6:
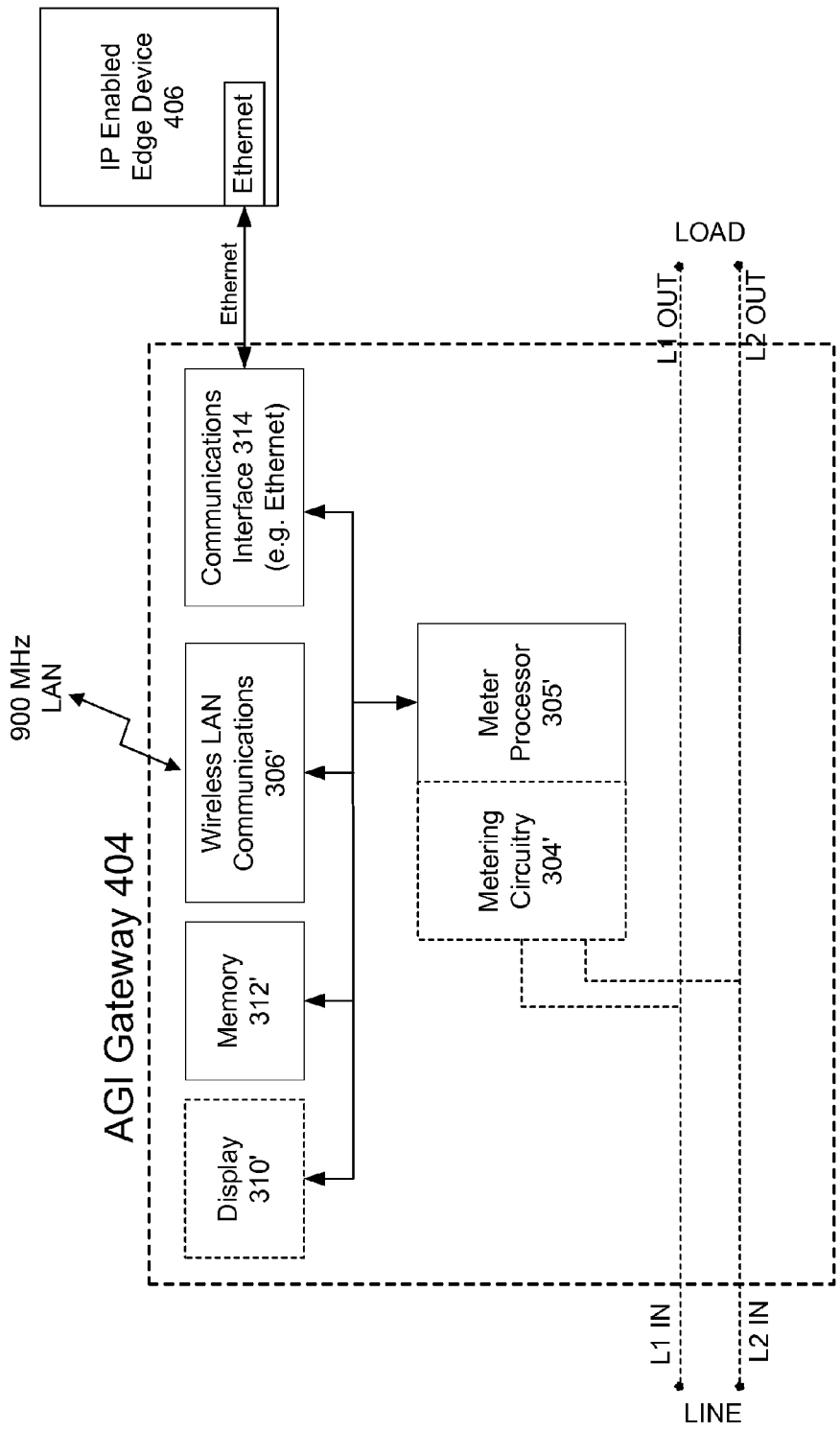
FIG. 6 is a block diagram illustrating an embodiment in which a network device, such as an IP-enabled edge device, is connected via an Ethernet connection to a node of the wireless network of the AMI system of FIGS. 1, 2, 3A-D.

FIG. 6 is a block diagram of one embodiment of AGI Gateway 404. In one embodiment, the AGI Gateway 404 may comprise substantially the same components and circuitry as a meter 114, including metering circuitry 304', meter processor 305', display 310', memory 312' and wireless LAN communications circuitry 306'. As such, in addition to serving as a connection to a network device, such as an IP-enabled edge device 406, the AGI Gateway 404 may also function as a typical metering device 114. In other embodiments, the AGI Gateway 404 may include only those components of a metering device 114 that are necessary to communicate with a collector 116 as a node on the wireless network. In such an embodiment, the AGI Gateway 404 may comprise a processor 305', memory 312' and wireless LAN communications circuitry 306', but not metering circuitry 304', display 310' and/or the connections L1 IN, L2 IN and L1 OUT and L2 OUT to a power line and load, respectively. In any case, in addition to those components necessary to communicate with a collector 116 as a node on the wireless network of the AMI system, the AGI Gateway 404 may further comprise another communications interface 314, which may be implemented in the form of an option board installed within the AGI Gateway 404 or in the form of other interface circuitry (not shown). The communications interface 314 may be used to connect the AGI Gateway 404 to a corresponding interface on the network device, e.g., IP-enabled edge device 406. For example, in one embodiment, the communications interface 314 may comprise an Ethernet interface. Again, such an Ethernet interface may be implemented on an option board installed within the AGI Gateway 404. A connection may then be made between the Ethernet interface 314 of the AGI Gateway 404 and a corresponding Ethernet interface on the IP-enabled edge device 406.

As mentioned above, in an embodiment, the AGI Gateway 404 may store one or more C12.19-compliant tables in its memory 312'. In one embodiment, one C12.19-complaint table stored in memory 312' is used to write IP messages destined for the IP-enabled edge device 406 that are received from a collector 116 (or the NMS 204) via the wireless LAN communications circuitry 306' in accordance with the communications protocol of the wireless network of the AMI system 110. As mentioned above, this first C12.19 table may be referred to as a "IP message request" table.

The memory 312' of the AGI Gateway 404 may further contain a second C12.19-compliant table that is used to store any response received back from the IP-enabled edge device 406 or any unsolicited IP message received via the communications interface 314 (e.g., the Ethernet connection). This second C12.19 table may be referred to as a "IP message response" table. In one embodiment, the first and second C12.19-compliant tables may comprise C12.19-compliant manufacturers tables. In an alternative embodiment, the first and second tables could comprise a single, shared C12.19-compliant table.

In addition to the method of operation described above and illustrated in FIGS. 7A-7C, in other embodiments, the AGI Gateway 404 may support a configuration where the IP message data payload is extracted from the IP message (either by the collector 116, or by the AGI Gateway 404 itself) and forwarded over an RS-232 communications interface to an RS-232 enabled edge device.

Several security features may be added to the AGI Gateway 404. These may include "typical" network security concepts, such as access control lists (ACLs), IP address filtering, transport layer filtering (i.e., only allow UDP traffic), and traffic throttling (prevent traffic flooding from the edge device).

In yet other embodiments, the communications protocol of the wireless network of the AMI system may provide a means to identify the payload type contained in the outbound and inbound packets of the protocol (e.g., an additional type field may be added to the outbound and inbound packet formats illustrated in FIGS. 5A and 5B). Such a payload type indication may be use to identify the payload of a network packet as an IP message. This may allow the IP message to be transferred to the AGI Gateway 404 without the overhead of ANSI C12 table write requests/responses. In such an embodiment, at the AGI Gateway 404, the IP message data may still need to be stored, at least temporarily, in the AGI Gateway 404 tables. This may be necessary to support IP messages that may be larger than a single wireless network packet payload and as such need to be reassembled at the AGI Gateway 404 before being forwarded to the IP-enabled edge device.

All or portions of the methods and apparatus described herein for routing IP messages destined for network devices over an existing network of an AMI system that operates in accordance with a different protocol may be embodied in hardware, software, or a combination of both. When embodied in software, the methods and apparatus of the present invention, or certain aspects or portions thereof, may be embodied in the form of program code (i.e., computer executable instructions). For example, the steps of FIGS. 7A-7C performed by the NMS 204, collector 116, or processor 305' of a AGI Gateway 404 may be embodied in the form of program code (processor or computer executable instructions). This program code may be stored on a computer-readable medium, such as a magnetic, electrical, or optical storage medium, including without limitation, a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. As used herein and in the claims, the term "computer-readable medium" does not include a signal. A device on which the program code executes, such as collector 116, AGI Gateway 404 or NMS 204, will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language. When implemented on a general-purpose processor, the program code may combine with the processor to provide a unique apparatus that operates analogously to specific logic circuits.

While systems and methods have been described and illustrated with reference to specific embodiments, those skilled in the art will recognize that modifications and variations may be made without departing from the principles described above and set forth in the following claims. For example, although in the embodiments described above, the systems and methods of the present invention are described in the context of a network of metering devices, such as electricity, gas, or water meters, it is understood that the present invention can be implemented in any kind of network. Also, while the exemplary metering system described above is a fixed network, the present invention can also be employed in mobile (walk by/drive by) systems. Accordingly, reference should be made to the following claims as describing the scope of the present invention.

What is claimed:

1. In an advanced metering infrastructure (AMI) system in which a server communicates with a wireless network of metering devices in accordance with a first communications protocol, each metering device defining a node on the wireless network and each node having a unique identifier on the wireless network, a method for communicating between the server and a network device that is designed to communicate in accordance with Internet Protocol (IP), wherein the first protocol of the wireless network of metering devices is a different protocol than the IP protocol, the method comprising:

connecting a communications interface of the network device to a corresponding communications interface on one of the nodes of the wireless network;

receiving at the server a message addressed to the network device, the message being formatted in accordance with the IP protocol;

determining the unique identifier of said one node on the wireless network to which the network device is connected;

using the determined unique identifier, transmitting a request to said one node via the wireless network and in accordance with the first communications protocol thereof, the command requesting that said one node write the IP message to a first ANSI C12.19-compliant table in a memory of the node, said one node thereafter retrieving the message from the first ANSI C12.19-compliant table and transmitting the message to the network device via its communications interface in accordance with the IP protocol, said one node storing a response to the message received from the network device in a second ANSI C12.19-compliant table in its memory;

transmitting a second request to said one node via the wireless network and in accordance with the first communications protocol thereof, the second command requesting that the response be read from the second ANSI C12.19-compliant table of said one node and transmitted to the server via the wireless network in accordance with the first communications protocol; and receiving the response at the server.

2. The method recited in claim 1, wherein the first ANSI C12.19 table and the second ANSI C12.19 table comprise a same table.

3. The method recited in claim 1, wherein the network device comprises an IP-enabled edge device.

4. The method recited in claim 1, wherein the communications interface of the network device by which the network device is connected to the node of the wireless network comprises an Ethernet interface.

5. The method recited in claim 1, wherein the first and second C12.19-compliant tables to which the message is written and in which the response is stored comprise C12.19-compliant manufacturers tables.

6. The method recited in claim 1, wherein the wireless network is a wireless mesh network.

7. The method recited in claim 1, wherein the wireless network further comprises a plurality of collectors, each collector communicating with a subset of the metering devices via said wireless network, and wherein said server comprises a collector.

8. The method recited in claim 1, wherein the wireless network further comprises a plurality of collectors, each collector communicating with a subset of the metering devices via said wireless network and communicating with the server via a second network, the second network comprising a wide area network, the Internet, an intranet, a telephone network, a Frequency Hopping Spread Spectrum (FHSS) radio network, a mesh network, a Wi-Fi (802.11) network, a Wi-Max (802.16) network, a land line (POTS) network, a TCP/IP network, a W-WAN, a GPRS network, a CDMA network, or a Fiber network.

9. Apparatus for communicating between a server of an advanced metering infrastructure (AMI) system and a network device, the AMI system comprising a wireless network of metering devices that communicate in accordance with a first communications protocol, each metering device defining a node on the wireless network and each node having a unique identifier on the wireless network, the network device being adapted to communicate in accordance with the Internet Protocol (IP), the first communication protocol being different from the IP protocol, the apparatus comprising:

a first communications interface that operates in accordance with the first communications protocol to communicate via said wireless network of the AMI system;

a second communications interface adapted to enable the apparatus to be connected to a corresponding interface of the network device;

a memory containing one or more ANSI C12.19-compliant data tables; and a processor that operates to:

communicate via the first communications interface and to establish the apparatus as a node of the wireless network;

receive, via the first communications interface in accordance with the first communications protocol, information encapsulated in a data format of the first communications protocol, the encapsulated information comprising an IP message formatted in accordance with the IP protocol and intended to be delivered to the network device;

extract the encapsulated IP message and write the IP message to a first one of the ANSI C12.19-compliant data tables in the memory of the apparatus;

transmit the IP message to the network device via the second communications interface in accordance with the IP protocol;

receive a response from the network device via the second communications interface in accordance with the IP protocol and write the response to a second one of the ANSI C12.19-compliant data tables in the memory; and upon request, read the response from the second one of the ANSI C12.19-complaint data tables and transmit the response to the server over the wireless network via the first communications interface and in accordance with the first communications protocol.

10. The apparatus recited in claim 9, wherein the first ANSI C12.19 table and the second ANSI C12.19 table comprise a same table.

11. The apparatus recited in claim 9, wherein the network device comprises an IP-enabled edge device.

12. The apparatus recited in claim 9, wherein the second communications interface comprises an Ethernet interface.

13. The apparatus recited in claim 9, wherein the C12.19-compliant tables to which the message is written and in which the response is stored comprise C12.19-compliant manufacturers tables.

14. The apparatus recited in claim 9, wherein the wireless network comprises a wireless mesh network.

15. The apparatus recited in claim 9, wherein the wireless network further comprises a plurality of collectors, each collector communicating with a subset of the metering devices via said wireless network, and wherein said server comprises a collector.

16. The apparatus recited in claim 9, wherein the processor writes the IP message received by the apparatus via the first communications protocol to the first C12.19-compliant data table at an offset zero.

17. The apparatus recited in claim 9, wherein the information received via the first communications interface is received in the form of a plurality of data packets each formatted in accordance with the first communications protocol and each containing a different portion of the IP message intended to be delivered to the network device, and wherein the processor writes each portion of the message to the first C12.19-compliant data table.

* * * * *